United States Patent
Lee et al.

(10) Patent No.: US 9,186,590 B2
(45) Date of Patent: Nov. 17, 2015

(54) MOTION SIMULATOR

(71) Applicant: MOTION DEVICE INC., Siheung, Gyeonggi-Do (KR)

(72) Inventors: Jong Chan Lee, Gyeonggi-Do (KR); Yu Sin Kang, Seoul (KR); Sang Gon Chun, Gyeonggi-Do (KR)

(73) Assignee: MOTION DEVICE INC., Siheung, Gyeonggi-do (KR)

( * ) Notice: Subject to any disclaimer, the term of this patent is extended or adjusted under 35 U.S.C. 154(b) by 0 days.

(21) Appl. No.: 14/627,257

(22) Filed: Feb. 20, 2015

(65) Prior Publication Data
US 2015/0157951 A1 Jun. 11, 2015

Related U.S. Application Data

(63) Continuation of application No. PCT/KR2013/003088, filed on Apr. 12, 2013.

(30) Foreign Application Priority Data

Aug. 28, 2012 (KR) .................. 10-2012-0094228

(51) Int. Cl.
*A63G 31/16* (2006.01)
*G09B 9/02* (2006.01)
*G09B 19/00* (2006.01)

(52) U.S. Cl.
CPC . *A63G 31/16* (2013.01); *G09B 9/02* (2013.01)

(58) Field of Classification Search
CPC ....... A63G 31/00; A63G 31/12; A63G 13/00; A63G 13/02; A63G 13/08; G09B 19/00; G09B 19/16

USPC ........... 472/59–61, 130; 434/29, 55, 247, 258
See application file for complete search history.

(56) References Cited

U.S. PATENT DOCUMENTS

| | | | | |
|---|---|---|---|---|
| 4,461,470 A | * | 7/1984 | Astroth | A63F 13/08 434/43 |
| 6,733,293 B2 | * | 5/2004 | Baker | G09B 19/16 434/55 |
| 7,094,157 B2 | * | 8/2006 | Fromyer | A63G 31/12 434/55 |
| 2005/0277092 A1 | * | 12/2005 | Hwang | G09B 19/16 434/55 |
| 2011/0177873 A1 | * | 7/2011 | Sebelia | A63F 13/02 472/130 |

* cited by examiner

*Primary Examiner* — Kien Nguyen
(74) *Attorney, Agent, or Firm* — Mintz Levin Cohn Ferris Glovsky and Popeo, P.C.; Kongsik Kim

(57) ABSTRACT

The present disclosure relates to a motion simulator including a rotating plate, a fixing plate, an operating frame disposed at and spaced apart from an upper portion of the rotating plate, and a plurality of link units coupled between the rotating plate and the operating frame to support and vertically move the operating frame. The rotating plate has a motor mounted through one side thereof and a plurality of casters mounted through a lower surface thereof. The caster is configured such that, when the motion simulator is used, rotation of the caster is inhibited to allow the wheel to roll in the rotational direction of the rotating plate. When the motion simulator is moved, the caster can be unlocked to enable the caster to rotate and the motion simulator to be freely pushed and moved. The fixing plate enables the rotating plate to be rotated and has a driven part.

7 Claims, 18 Drawing Sheets

(a)

(b)

(a)                    (b)

MOTION SIMULATOR

CROSS-REFERENCE TO RELATED APPLICATIONS

This application is a continuation of International Application No. PCT/KR2013/003088 filed on Apr. 12, 2013 which claims priority to Korean Application No. 10-2012-0094228 filed on Aug. 28, 2012, which applications are incorporated herein by reference.

TECHNICAL FIELD

The present invention relates to a motion simulator, and more particularly, to a motion simulator which, despite having a simple structure, can stably perform various types of simulation motion and is easily installed and moved.

BACKGROUND ART

In general, a motion simulator is a device for reproducing a dynamic change in response to a virtual environment controlled by a computer to enable a user to feel motion in virtual reality as if it were real motion. Such motion simulators can realize a flight simulation or a driving simulation and have recently been widely used as simulators for games or simulators for theaters that enable people to feel three-dimensional motion.

The motion simulator performs three-dimensional movement through a combination of linear movement and rotational movement. Movement of an object in a space is performed by a combination of linear movement in the forward/rearward direction (Z axis), in the lateral direction (X axis) and the upward/downward direction (Y axis), roll with the Z axis as a rotation center, pitch with the X axis as a rotation center, and yaw with the Y axis as a rotation center.

As one example of such a conventional motion simulator, a virtual reality experience simulator is disclosed in Korean Patent Laid-Open Publication No. 10-1999-0060729. Referring to FIG. 1, in the conventional motion simulator, a base plate 2 is rotatably coupled to an upper portion of a pedestal 1 by means of a rotating means 80, a lower end portion of a central shaft 40 is secured to an intermediate portion of the base plate 2 and a supporting plate 10 is secured to the base plate 2.

A moving plate 20 is connected to an upper portion of the central shaft via a ball joint 70, a plurality of rotary rods 30 are rotatably coupled to a peripheral portion of the moving plate 20, a plurality of length-variable elements 50 are connected between the supporting plate 10 and the moving plate 20, a lower end of the length-variable element 50 is connected to the supporting plate 10 by the ball joint 70, and an upper end of the length-variable element 50 is connected to the rotary rod 30 by a universal joint 60.

The rotating means 80 has a structure in which a motor 81 is secured to the pedestal 1 and a pinion 82 fixed to a shaft of the motor 81 is meshed with a driven gear 83 secured to an outer circumference surface of the base plate 2. When the motor 81 is operated, the pinion 82 is rotated to rotate the driven gear 83 and the base plate 2 is thus rotated. When the base plate 2 is rotated, the supporting plate 10, the length-variable element 50 and the moving plate 20 which are coupled to an upper portion of the base plate are rotated together.

According to the above structure, the length-variable element 50 is selectively driven to displace the moving plate 20 and rotate the base plate 2 so that the three dimensional movement can be performed.

However, the aforementioned conventional motion simulator is configured to allow the pinion 82 coupled to the shaft of the motor 81 mounted on the pedestal 1 to be meshed with the driven gear 83 of the base plate 2 for rotating the base plate 2 having a heavy weight and its upper structure. Therefore, there is a drawback in that, since an inertial force is increased when the base plate 2 is rotated, if a rotational direction of the base plate 2 is reversed, a high load is applied to the motor 81 and it is difficult to quickly and accurately control yaw.

In addition, the conventional motion simulator has problems in that, since the lower supporting structure is composed of the pedestal 1 and the base plate 2, the apparatus has an excessive weight, and since the pedestal 1 is configured to be placed on a floor of an installation site, it is not easy to move the motion simulator.

SUMMARY

The present invention is conceived to solve the aforementioned problems, and an object of the present invention is to provide a motion simulator which, despite having a simple structure, can realize various types of simulation motion and can be easily installed and moved.

Another object of the present invention is to provide a motion simulator which has a simplified lower support structure to enable a weight of an apparatus and a manufacturing cost to be reduced.

A motion simulator of the present invention for realizing the above object may include a rotating plate (100) on which a motor (110) is mounted through one side thereof and on which a plurality of casters (120) are mounted through a lower surface thereof; a fixing plate (200) supporting a lower portion of the rotating plate to enable the rotating plate (100) to be rotated and having a driven part fixedly mounted thereon and meshed with a shaft of the motor (110); an operating frame (300) disposed at and spaced apart from an upper portion of the rotating plate (100); and a plurality of link units coupled between the rotating plate (100) and the operating frame (300) to support and vertically move the operating frame (300).

In this case, the caster (120) is provided with a locking means (140) restricting yaw of the caster (120) with respect to a vertical line to lock the caster (120) at a location which is parallel to rotation of the rotating plate (100) when the motion simulator is used and to unlock the caster (120) when the motion simulator is moved.

Also, a first sprocket (111) may be coupled to the shaft of the motor (100), and the driven part may include a plurality of second sprockets (210) mounted on the fixing plate (200) and a chain (220) connected to the first sprocket (111) and the plurality of second sprockets (210).

In addition, the rotating plate (100) and the fixing plate (200) may be coaxially disposed on one central axial line and configured such that a distance from the central axial line to the border of the rotating plate (100) is greater than a distance from the central axial line to the border of the fixing plate (200) to allow the caster (120) to be located outside the fixing plate (200).

Also, a rotating support part (230) to which a central shaft (231) is rotatably coupled is provided on an upper surface of a central portion of the fixing plate (200) to support the rotating plate (100), a through hole is formed in a central portion of the rotating plate (100) to allow the central shaft (231) to vertically pass through the through hole (101), and a hardlock nut (232) is coupled to the central shaft (231) passing through the through hole (101).

In addition, the plurality of second sprockets (210) mounted on the fixing plate (200) may be disposed at regular intervals with respect to a central axial line of the fixing plate (200) and the first sprocket (111) may be eccentrically disposed outside an imaginary connecting line connecting the plurality of second sprockets (210).

Also, so as to allow the caster (120) to be spaced from a floor (B) when the motion simulator is used, a rubber plate (240) may be provided between a lower end portion of the fixing plate (200) and the floor (B).

In addition, a raising/lowering means (130) may be provided between the rotating plate (100) and the caster (120) for adjusting a vertical location of the caster (120).

In this case, the raising/lowering means (130) may include a fixing member (131) mounted on a lower surface of the rotating plate (100); a vertical moving member (132) secured to an upper surface of the caster (120) and disposed so as to be vertically moved in the fixing member (131) along with the caster (120); and a shaft (133) passing through an upper portion of the fixing member (131), coupled to the vertical moving member (132) through a lower end thereof and connected to a vertical driving means through an upper end thereof.

According to the present invention, since a motion simulator is provided with a rotating plate on which a plurality of casters and a motor are mounted and a fixing plate supporting the rotating plate to enable the rotating plate to be rotated and having a driven part fixedly mounted thereon and meshed with a shaft of the motor, it becomes easy to install and move the motion simulator.

In addition, the motion simulator of the present invention stably realizes various simulations of the motion with a simple configuration to enable a user to experience more realistic virtual environments.

Also, a chain is connected to a first sprocket coupled to the shaft of the motor mounted on one side of the rotating plate and a plurality of second sprockets fixed to an upper surface of the fixing plate to allow yaw to be performed through an operation of the motor so that a load applied to the motor can be reduced and yaw can be quickly and accurately realized.

DETAILED DESCRIPTION

Figure 1:
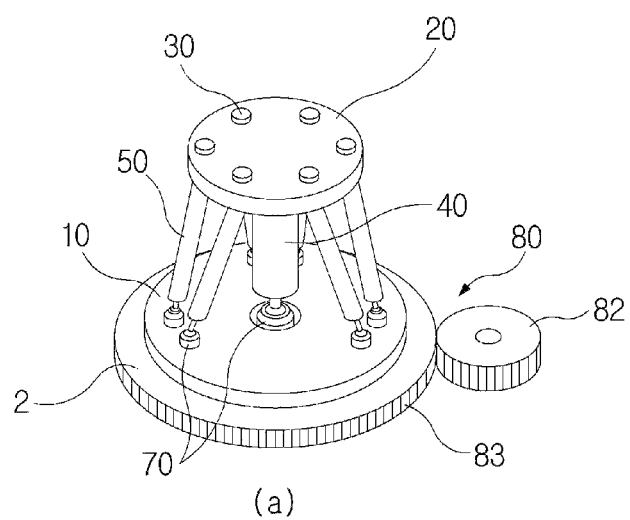
FIG. 1 is a view showing one example of a conventional motion simulator.
Figure 1:
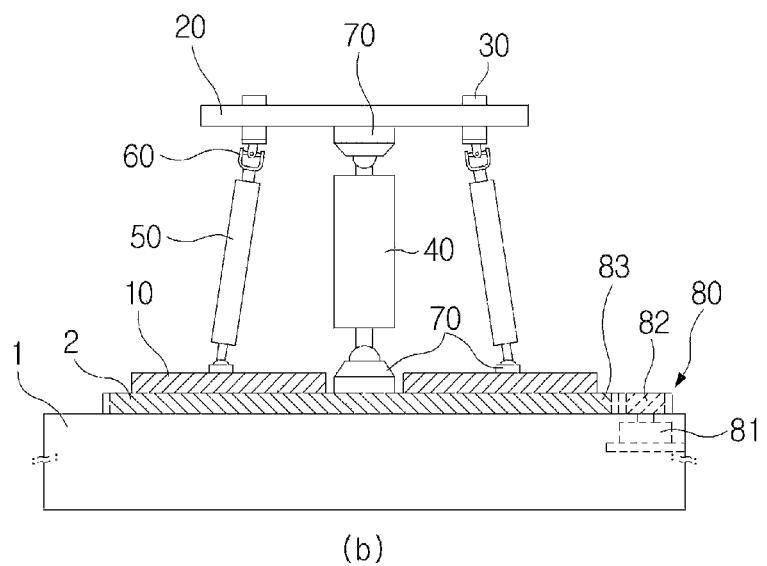
Figure 2:
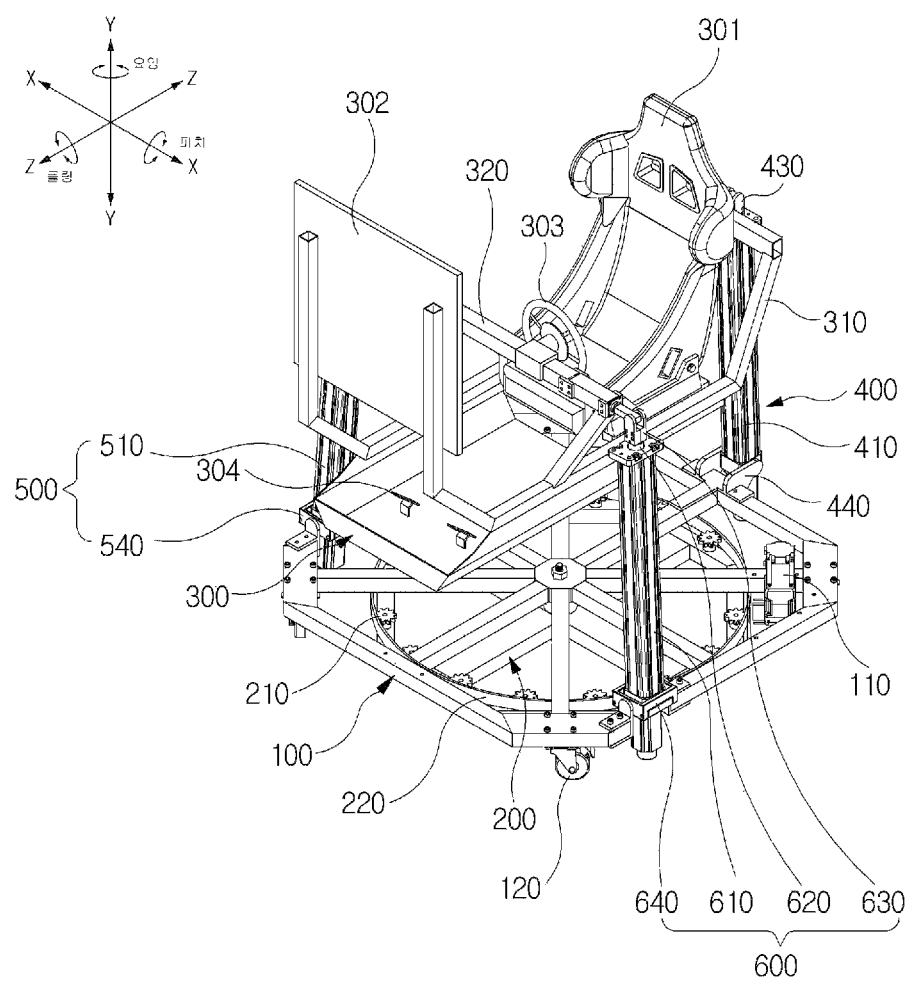
FIG. 2 is a perspective view of a motion simulator according to the present invention.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention. In description of the movement directions, as shown in FIG. 2, roll is described as rotational movement with a forward/rearward direction (Z axis) as a rotational center, pitch is described as rotational movement with a right/left direction (X axis) as a rotational center and yaw is described as rotational movement with an upward/downward direction (Y axis) as a rotational center.

Referring to FIG. 2 to FIG. 5, a motion simulator according to the present invention includes a rotating plate 100 on which a motor 110 is mounted through one side thereof and on which a plurality of casters 120 are mounted through a lower surface thereof, a fixing plate 200 supporting a lower portion of the rotating plate 100 to enable the rotating plate to be rotated and having a driven part fixedly mounted thereon and meshed with a shaft of the motor 110, an operating frame 300 disposed at and spaced apart from an upper portion of the rotating plate 100 and a plurality of link units coupled between the rotating plate 100 and the operating frame 300 to support and vertically move the operating frame 300.

The plurality of link units include a first link unit 400 connected to a rear side of the operating frame 300 through an upper end thereof to enable the operating frame to roll and pitch, connected to a rear end of the rotating plate 100 through a lower end thereof to enable the rotating plate to pitch and transmitting power of a first driving means to the operating frame to enable a rear end of the operating frame 300 to be vertically moved, and a second link unit 500 and a third link unit 600 connected to left and right sides of the operating frame 300 through upper ends thereof, respectively, to enable the operating frame to roll and pitch, connected to left and right side ends of the rotating plate 100 through lower ends thereof, respectively, to enable the rotating plate to roll and transmitting power of a second driving means and a third driving means to the operating frame to enable left and right side ends of the operating frame 300 to be vertically moved.

The operating frame 300 may be provided with a seat 301 on which a user sits, a monitor 302 providing a virtual environment as an image, which is obtained according to the user's manipulation, a handle 303 handled by the user to provide the virtual environment and a pedal 4 for adjusting a speed of a vehicle. The above structural elements may be substituted with other elements according to a purpose of the motion simulator. In addition, a first supporting member 310 for supporting the seat 301 and the monitor 302, and a second supporting member 320 connected to the first supporting member 310 to support the handle 303 may be coupled to the operating frame 300.

The first link unit 400 includes a first link member 410 connected through a lower end thereof to a first lower connecting member 440 which is pitchably connected to a rear end of the rotating plate 100 and a first rod 420 which slides in the first link member 410 by the first driving means and which is rollably and pitchably connected through an upper end thereof to a rear end of the first supporting member 310.

The second link unit 500 includes a second link member 510 connected through a lower end thereof to a second lower connecting member 540 which is rollably connected to one side of the rotating plate 100 and a second rod 520 that slides in the second link member 510 by the second driving means and is connected through an upper end thereof to a second upper connecting member 530 which is rollably and pitchably connected to one side end of the second supporting member 320.

The third link unit 600 has the structure which is the same as that of the second link unit 500 and is disposed symmetrically with respect to the second link unit. This third link unit includes a third link member 610 connected through a lower end thereof to a third lower connecting member 640 which is rollably connected to the other side of the rotating plate 100 and a third rod 620 that slides in the third link member 610 by the third driving means and is connected through an upper end thereof to a third upper connecting member 630 which is rollably and pitchably connected to the other side end of the second supporting member 320.

Figure 4:
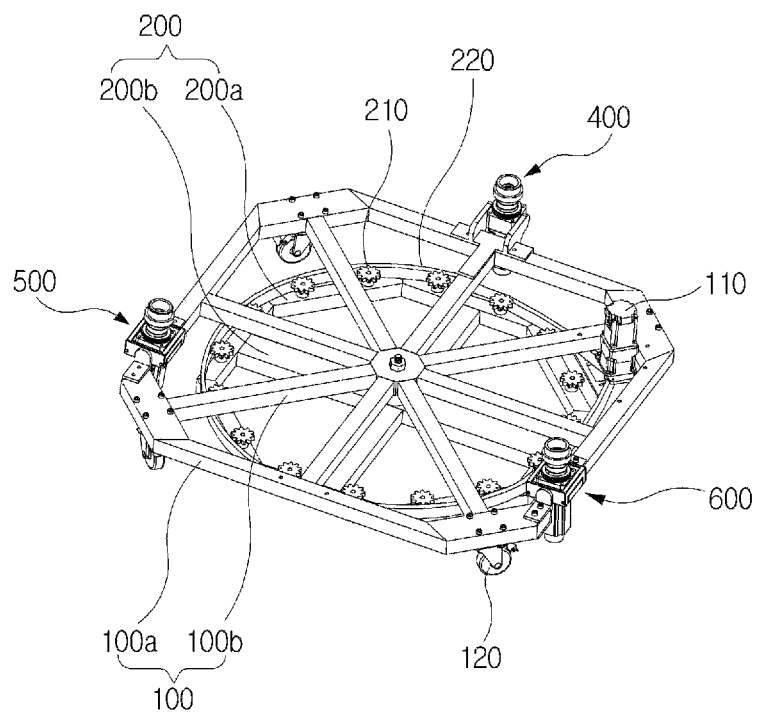
FIG. 4 is a perspective view showing a coupling structure of a rotating plate and a fixing plate constituting a motion simulator according to the present invention.
Figure 5:
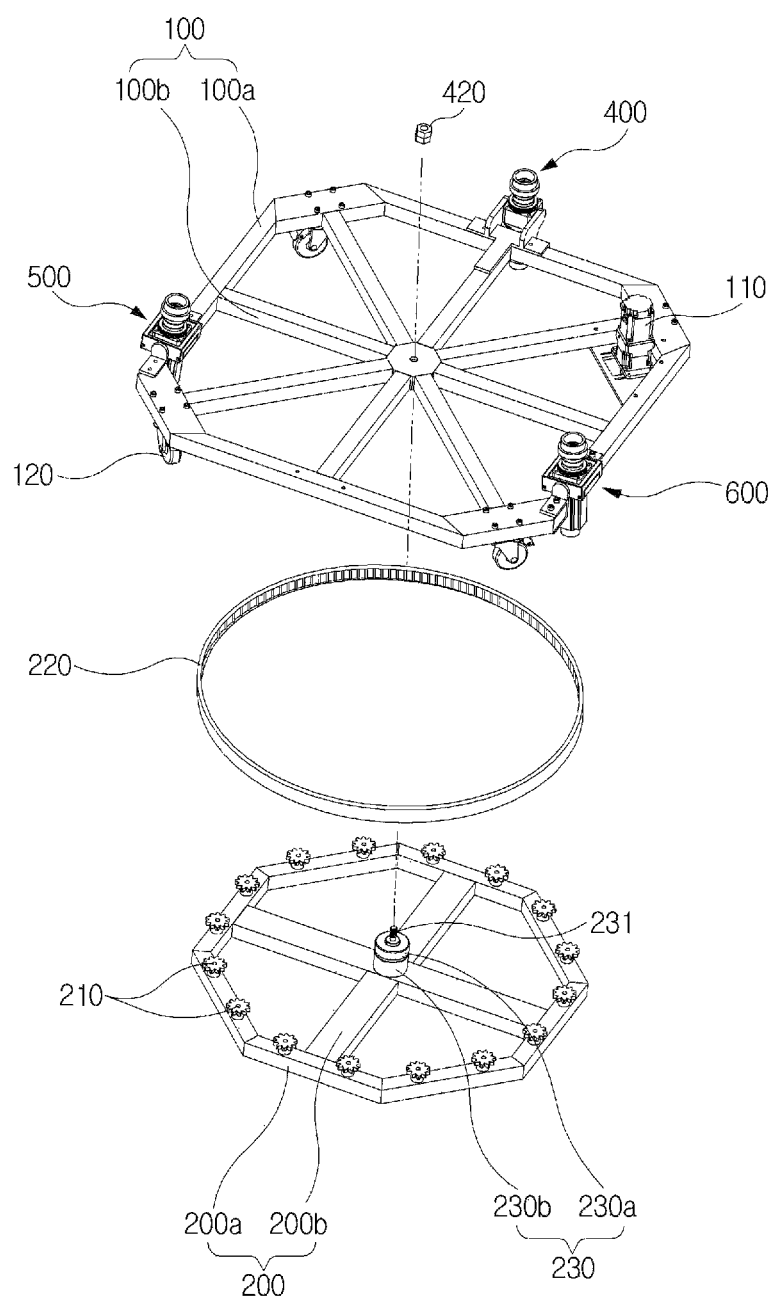
FIG. 5 is an exploded perspective view of FIG. 4.

The rotating plate 100 is rotatably supported by the fixing plate 200 when the motion simulator is being operated and supports the entire structure of the motion simulator when the motion simulator is moved. As shown in FIG. 4 and FIG. 5, the rotating plate includes a first frame 100a forming a border and a plurality of second frames 100b secured to an inner surface of the first frame 100a via both ends thereof, which are disposed at regular angular intervals.

Figure 3:
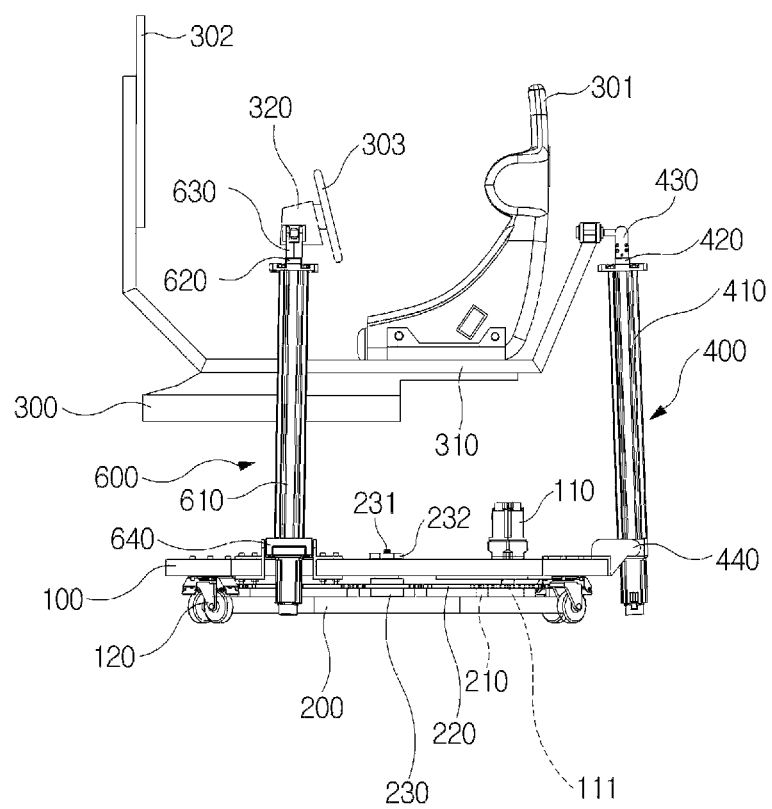
FIG. 3 is a side view of a motion simulator according to the present invention.

The motor 110 providing a driving force for rotating the rotating plate 100 is mounted on one side of the rotating plate 100, and a first sprocket 111 is coupled to a shaft of the motor 100 which is directed downward as shown in FIG. 3.

A plurality of casters 120 are mounted on a lower surface of the first frame 100a at regular angular intervals, and lower end portions of the first link unit 400, the second link unit 500 and the third link unit 600 are coupled to an upper surface of the first frame 100a. A plurality of second frames 100b are coupled to each other so that the second frames intersect each other at a central portion of the rotating plate 100, and a through hole 101 through which a central shaft 231 passes is formed in the intersecting central portion.

The fixing plate 200 supports the entire structure of the motion simulator when the motion simulator is being operated and may be spaced upward from a bottom surface to prevent interference between the bottom surface and the fixing plate when the motion simulator is moved. As shown in FIG. 4 and FIG. 5, the fixing plate includes a third frame 200a forming a border and a plurality of fourth frames 200b secured to an inner surface of the third frame 200a via both ends thereof, which are disposed at regular angular intervals.

A plurality of second sprockets 210 are fixedly mounted on an upper surface of the third frame 200a at regular intervals with respect to a central axial line, and a plurality of fourth frames 200b are coupled to each other so that the fourth frames intersect each other at a central portion of the fixing plate 200, and a rotating support part 230 to which the central shaft 231 is rotatably coupled is provided on an upper surface of the above intersecting central portion to support the rotating plate 100. The rotating support part 230 is configured such that an upper portion 230a is connected to a lower portion 230b through a bearing to enable the upper portion to be rotated in place with respect to the lower portion.

The central shaft 231 which is perpendicularly coupled to a center of the upper portion 230a of the rotating support part 230 is inserted in a through hole 101 formed in the rotating plate 100, and a nut 232 is coupled to the central shaft 231 passing through the through hole 101 and protrudes above the rotating plate 100. In this case, two nuts 232 are doubly coupled to the central shaft to prevent the nuts from loosening when the rotating plate 100 is being rotated, and it is preferable to employ a hardlock nut, which is coupled in the form of a wedge, as the inner nut.

The rotating plate 100 and the fixing plate 200 are coaxially disposed on a vertical axial line of one central shaft 231. The rotating plate 100 and the fixing plate 200 are configured to allow a distance from the central shaft 231 to the border of the rotating plate 100 to be greater than a distance from the central shaft 231 to the border of the fixing plate 200. Due to the above structure, the first frame 100a of the rotating plate 100 may be placed outside the third frame 200a of the fixing plate 200 and the caster 120 mounted on a lower surface of the first frame 100a may be placed outside the fixing plate 200 to prevent the caster 120 from interfering with the fixing plate 200 when the rotating plate 100 is rotated.

In addition, the rotating plate 100 and the fixing plate 200 are vertically spaced apart from and coupled to each other by the rotating support part 230. The first sprocket 111 is coupled to the shaft of the motor 100, and the driven part includes the plurality of second sprockets 210 mounted on the fixing plate 200 and a chain 220 connected to the first sprocket 111 and the plurality of second sprockets 210.

The first sprocket 111 coupled to the shaft of the motor 110 mounted on the rotating plate 100 and the plurality of second sprockets 210 mounted on an upper surface of the fixing plate 200 are on the same level. Also, the first sprocket 111 coupled to the shaft of the motor 110 is eccentrically deviated outward from an imaginary connecting line connecting the plurality of second sprockets 210.

As one embodiment of a power transmitting structure for rotating the rotating plate 100 using the power of the motor 100, an inner surface of a chain 220 may be meshed with an outer surface of the first sprocket 111 and outer surfaces of the plurality of second sprockets 210.

As another embodiment of the power transmitting structure for rotating the rotating plate 100 using the power of the motor 100, a pinion (not shown) may be coupled to the shaft of the motor 110 and the rotating plate may be provided with a driven gear meshed with the pinion.

As another embodiment of the power transmitting structure for rotating the rotating plate 100 using the power of the motor 100, a first pulley (not shown) may be coupled to the shaft of the motor 110, a plurality of second pulleys (not shown) may be mounted on an upper surface of the fixing plate 220 and a timing belt may then be connected to the first pulley and the plurality of second pulleys.

When the motion simulator is in use, the fixing plate 200 is supported on a floor B of an installation site and the rotating plate 100 is spaced upward from the floor B. If the motor 110 is operated in the state in which the fixing plate 200 is supported on the floor B and the rotating plate 100 and the entire structure above the rotating plate can be freely rotated, the first sprocket 111 coupled to the shaft of the motor 110 is rotated and the power is transmitted to the chain 220 meshed with the first sprocket 111. Since the plurality of second sprockets 210 are fixedly mounted on the fixing plate 200 so as not to be rotated, when the power is being transmitted, due to a reaction force applied to the chain 220, the first sprocket 111 coupled to the shaft of the motor 110 is rotated along an inner surface of the chain 220, and the rotating plate 110 and the structural elements on the rotating plate are simultaneously rotated.

In the motion simulator of the present invention constructed as above, since the rotating plate 100 including the first frame 100a and the second frame 100b and the fixing plate 200 including the third frame 200a and the fourth frame 200b vertically overlap each other to from a lower supporting structure and the power of the motor 110 mounted on the rotating plate 100 is transmitted to the rotating plate 100 via the plurality of second sprockets 210 and the chain 220, when yaw is performed, as compared with a conventional simulator, a weight of the rotating plate 100 is significantly reduced, and thus the inertial force applied to the rotating plate 100 is decreased, and a load of the motor 100 may thus be reduced, enabling a high reduction gear ratio to be obtained. In addition, a response speed of the yaw is increased to enable quick and accurate yaw, and a weight of the fixing plate 200 is also reduced so that the entire weight of the motion simulator is reduced, thereby facilitating movement of the motion simulator.

A configuration for modifying the supporting structure of the rotating plate 100 and the fixing plate 200 against the floor B when the motion simulator is used and when the motion simulator is moved is illustrated below.

Figure 6:
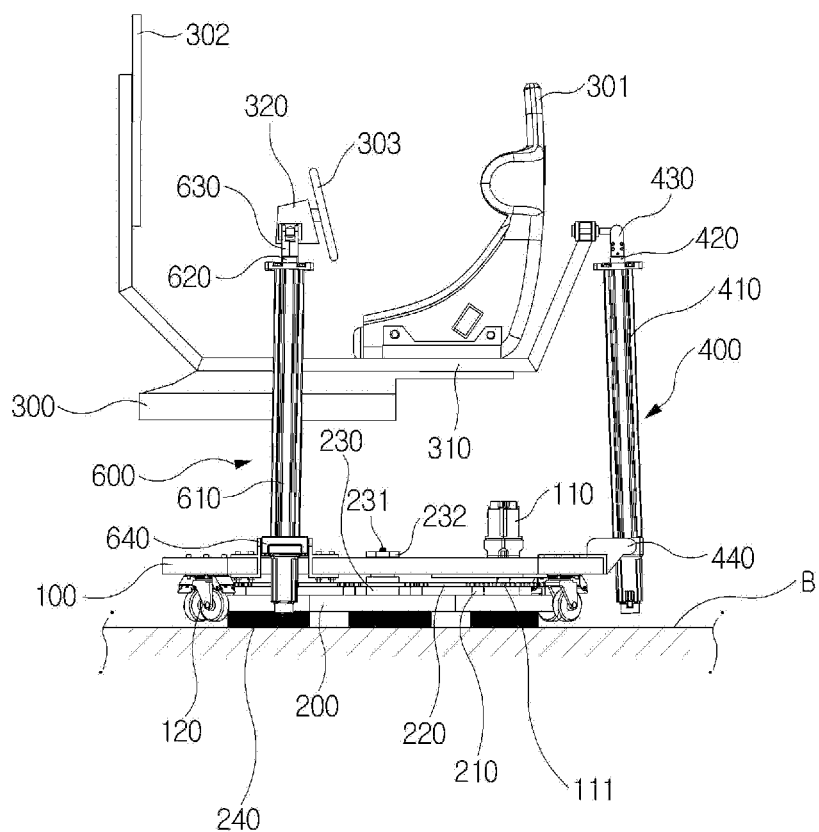
FIG. 6 is a side view showing one example of an installing structure of a motion simulator according to the present invention.

In one embodiment for modifying the supporting structure of the rotating plate 100 and the fixing plate 200 against the floor B, as shown in FIG. 6, as a structure for allowing the caster 120 to be spaced apart from the floor B when the motion simulator is used and for allowing a weight of the motion simulator to be supported by the fixing plate 200, a rubber plate 240 may be provided between a lower end portion of the fixing plate 200 and the floor B. In this case, the rubber plate 240 may be configured to allow a plurality of rubber plates to be disposed below the fixing plate 200 at regular intervals. If the rubber plate 240 is disposed below the fixing plate 200, the fixing plate 200 is fixed in the state in which the fixing plate is supported on the floor B, and a lower end portion of the caster 120 mounted on the rotating plate 100 is spaced upward from the floor B so that the rotating plate 100 can be rotated.

When the motion simulator is moved, by removing the rubber plate 240 disposed between the fixing plate 200 and the floor B, the fixing plate 200 is spaced apart from the floor B and a weight of the motion simulator is applied to the caster 120 mounted on the rotating plate 100 to enable movement of the motion simulator to be easily performed.

Figure 7:
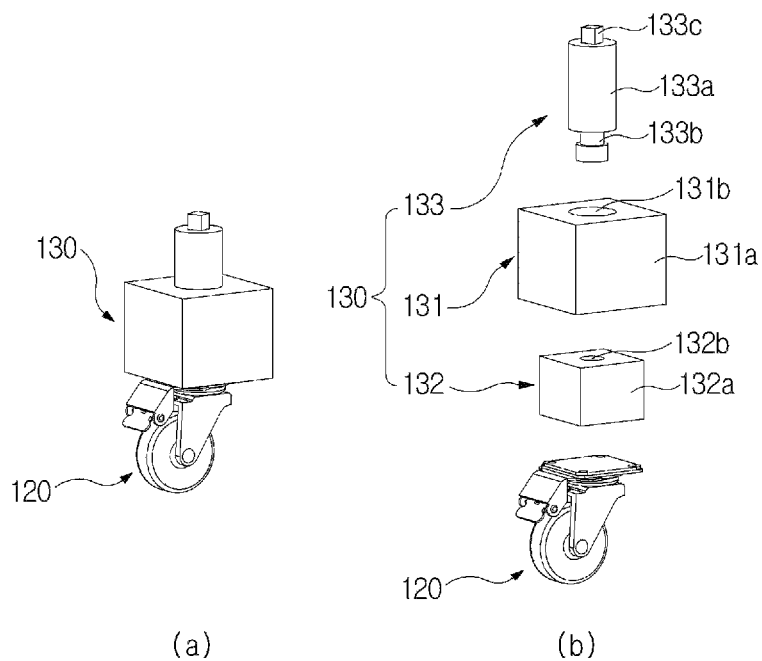
FIG. 7 is a view showing an embodiment in which a caster according to the present invention is provided with a raising/lowering means.
Figure 8:
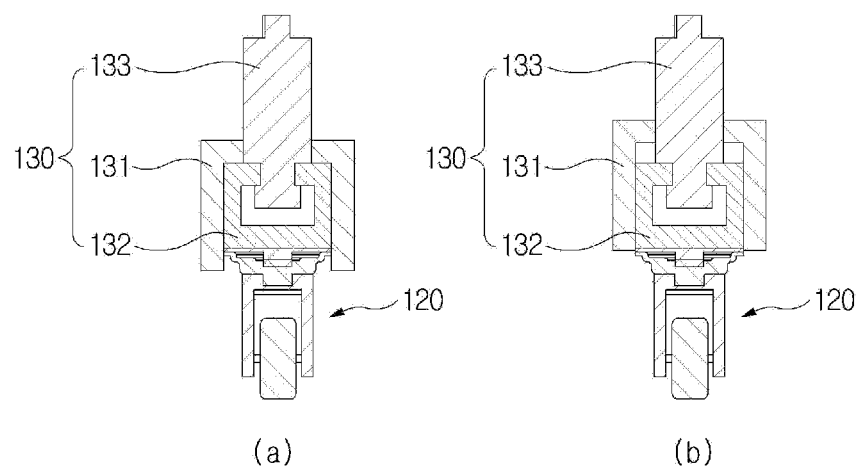
FIG. 8 is a cross-section view showing a raised state and a lowered state of the caster shown in FIG. 7.

As another embodiment for modifying the supporting structure of the rotating plate 100 and the fixing plate 200 against the floor B, as shown in FIG. 7 and FIG. 8, a raising/lowering means 130 may be provided between the rotating plate 100 and the caster 120 for adjusting a vertical location of the caster 120. The raising/lowering means 130 lifts the caster 20 to support the fixing plate 200 on the floor B for enabling the rotating plate 100 to be rotated when the motion simulator is used, and lowers the caster 120 to allow the fixing plate 200 to be spaced apart from the floor B for facilitating movement of the motion simulator when the motion simulator is moved.

The raising/lowering means 130 may include a fixing member 131 mounted on a lower surface of the rotating plate 100 through an upper surface thereof; a vertical moving member 132 secured to an upper surface of the caster 120 and disposed so as to be vertically moved in the fixing member 131 along with the caster 120; and a shaft 133 passing through an upper portion of the fixing member 131, coupled to the vertical moving member 132 through a lower end thereof and connected to a vertical driving means (not shown) through an upper end thereof.

In the fixing member 131, a through hole 131b is formed in a center of an upper surface of a hollow hexahedral body part 131a to allow a body part 133a of the shaft 133 to be inserted in the through hole 131b and a lower portion of the body part 131a of the fixing member 131 is opened to enable the vertical moving member 132 and the caster 121 to be vertically moved in the body part 131a of the fixing member 131.

In the vertical moving member 132, a coupling hole 132b is formed in a center of an upper surface of a hollow hexahedral body part 132a to allow a coupling groove 133b formed at a lower end portion of the shaft 133 to be coupled to the coupling hole 132b, and an upper portion of the caster 120 is secured to a lower surface of the body part 132a of the vertical moving member 132. An upper coupling part 133c formed at an upper end portion of the shaft 133 is connected to the vertical driving means (not shown).

When the motion simulator is used, as shown (a) of FIG. 8, the shaft 133, the vertical moving member 132 and the caster are moved upward by means of the vertical driving means so that the rotating plate 100 becomes capable of rotating and the fixing plate 200 is supported on the floor B. When the motion simulator is moved, as shown in (b) of FIG. 8, the shaft 133, the vertical moving member 132 and the caster 120 are moved downward by means of the vertical driving means so that the caster 120 is supported on the floor B, and the fixing plate 200 is spaced upward from the floor B to allow the motion simulator to be freely moved.

Meanwhile, the present invention is characterized in that a locking means 140 is provided for limiting yaw of the caster 120 when the motion simulator is used and is moved.

When the motion simulator is used, in the state in which the wheel 121 of the caster 120 is parallel to a rotational direction of the rotating plate 100, the locking means 140 locks the caster 120 such that yaw of the caster is inhibited, to prevent interference when the rotating plate 100 is rotated and to perform stable rotation of the rotating plate. When the motion simulator is moved, the locking means unlocks the caster 120 to allow the caster 120 to freely yaw and to facilitate movement of the motion simulator.

Figure 9:
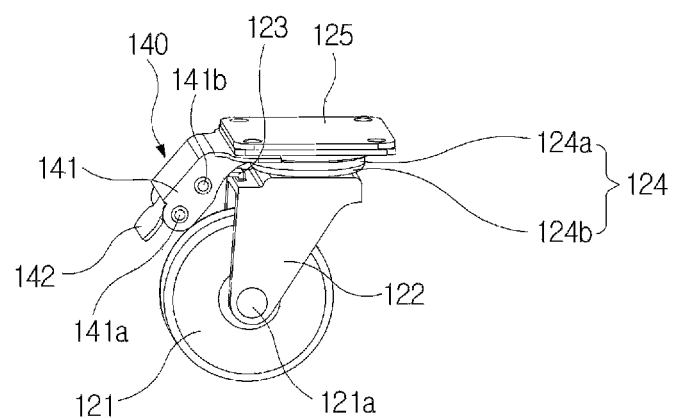
FIG. 9 is a perspective view showing an embodiment in which a caster according to the present invention is provided with a locking means.
Figure 10:
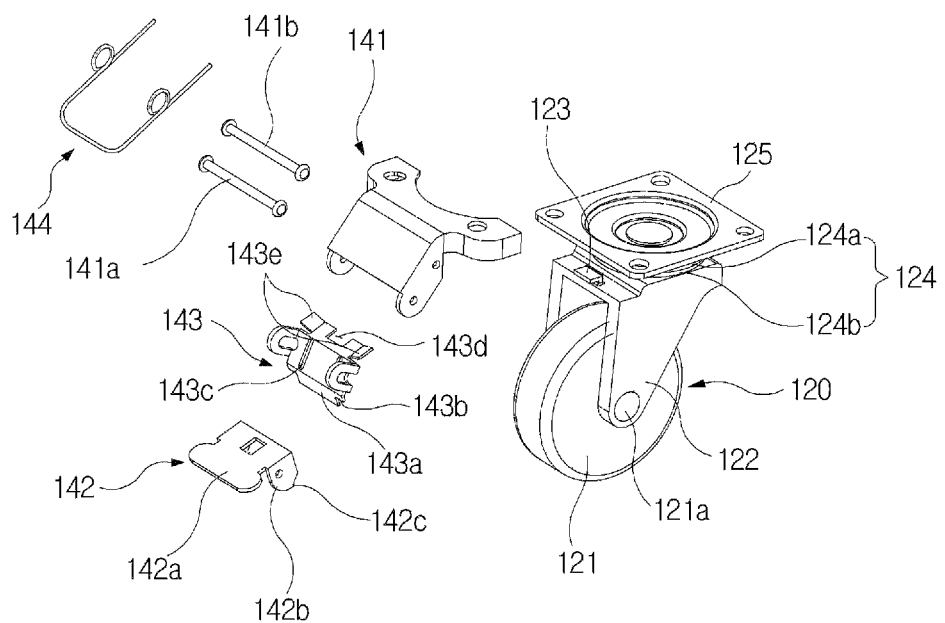
FIG. 10 is an exploded perspective view of FIG. 9.

Referring to FIG. 9 and FIG. 10, the caster 120 includes a wheel 121, a wheel-supporting fixture 122 connected to a wheel shaft 121a of the wheel 121 and having a "¬" shaped locking hook 123 provided at one side of an upper portion thereof, a rotating part 124 connected to an upper end of the wheel-supporting fixture 122 and an upper fixing plate 125 securing the rotating part to the rotating plate 100. An upper portion 124a of the rotating part 124 fixed to the upper fixing plate 125 and a lower portion 124b of the rotating part 124 fixed to the wheel-supporting fixture 122 are connected to each other to enable the upper portion and the lower portion to be rotated relative to each other.

The locking means 140 includes a body part 141 coupled to the upper fixing plate 125 through an end thereof and having a front rotational shaft 141a and a second rotational shaft 141b spaced apart from each other in a forward/rearward direction and coupled therein; a first lever 142 having a first knob part 142a formed to protrude toward a front side of the body part 141, cam parts 142b formed at both sides of a rear portion and rotatably coupled to the first rotational shaft 141a and first engaging parts 142c formed at rear ends of each of the cam parts 142b; a second lever 143 rotatably coupled to the second rotational shaft 141b and having second engaging parts 143b formed at both sides of a front portion thereof to be in sliding contact with the cam parts 142b and engaged with the first engaging part 142c, a "⊏" shaped locking recess 143d formed at a center portion of a rear end thereof to be engaged with the locking hook 123, and guide surfaces 143e formed at both sides of the locking recess 143d to guide the locking hook 123 toward the locking groove 143d in response to the yaw of the caster 120; and an elastic member 144 which elastically supports the second lever 143 to allow a front end portion of the second lever 143 to press a rear portion of the first lever 142.

The elastic member 144 passes through an elastic member fixing hole 143c formed in the second lever 143 and is then disposed around the second rotational shaft 141b, and both ends of the elastic member 144 are coupled to the body part to be supported on an inner surface of the body part 141.

Figure 11:
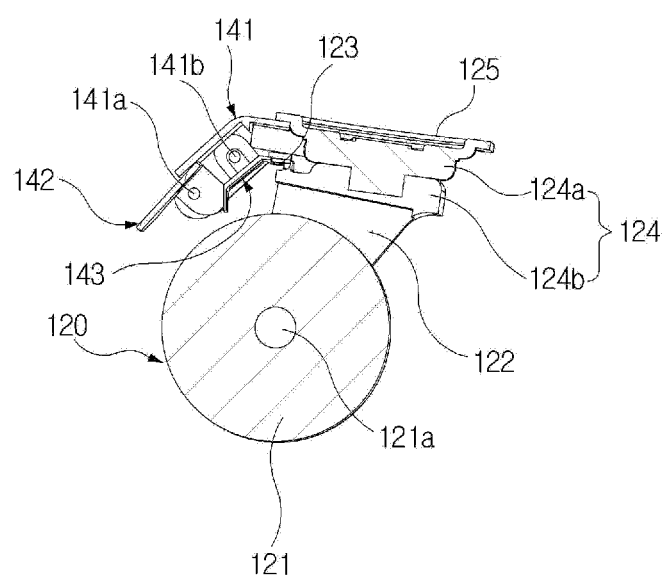
FIG. 11 is a cross-sectional view showing a locked state of the caster shown in FIG. 9.

FIG. 11 shows that when the caster 120 is parallel to the rotational direction of the rotating plate 100, the caster 120 is locked to inhibit the yaw of the caster. In this case, the first knob part 142a of the first lever 142 is pulled downward to release engagement between the first engaging part 142c of the first lever 142 and the second engaging parts 143b of the second lever 143. For this reason, the locking recess 143d of the second lever 143 is located at a level at which the locking recess can be hooked to the locking hook 123 so that, when the caster 120 yaws, the locking hook 123 can be guided toward the locking recess 143d along the guide surface 143e of the second lever 143 to become locked.

Figure 12:
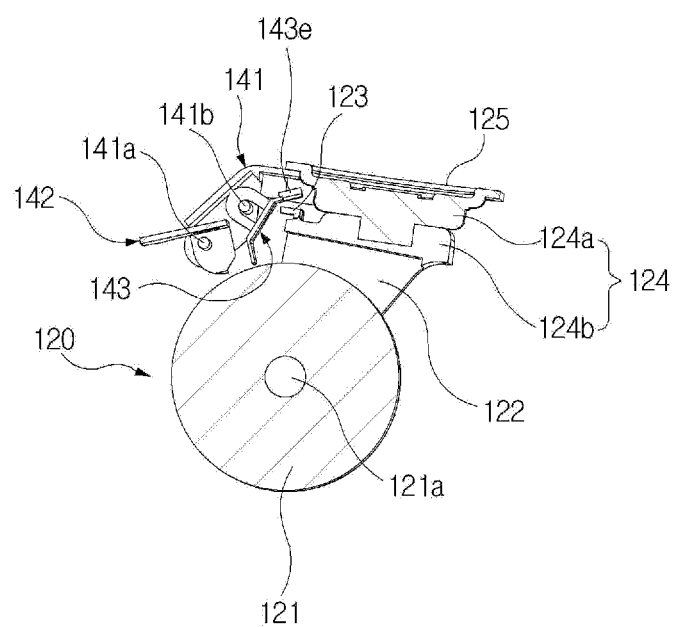
FIG. 12 is a cross-sectional view showing an unlocked state of the caster shown in FIG. 9.

Alternatively, when the motion simulator is moved, as shown in FIG. 12, when the first knob part 142a of the first lever 142 is pulled upward, the first lever 142 and the second lever 143 are rotated in opposite directions according to the principle of the lever, and the second engaging part 143b of the second lever 143 is then rotated along the cam part 142b of the first lever 142 to be smoothly engaged with the first engaging part 142c. In this case, a side end of the rear portion of the second lever 143 on which the locking recess 143d and the guide surface 143e are formed is lifted above the locking hook 123 to be spaced apart from the locking hook so that, when the caster 120 yaws, since the locking recess 143d is placed at a location at which the locking recess cannot be hooked to the locking hook 123, the caster 120 can freely yaw. At this time, the side end of the front portion of the second lever 143 on which the second engaging part 143b is formed is pressurized by a force of the elastic member 144 toward a side end of the rear portion of the first lever 142 at which the first engaging part 142c is formed to maintain engagement between the first engaging part 142c and the second engaging part 143b. Therefore, even though the first knob part 142a of the first lever 142 is pulled downward, rotation of the first lever 142 is inhibited to continuously maintain an unlocked state.

As a structure for converting the unlocked state into a lockable state, a second knob part 143a is formed on the second lever 143 for manually releasing engagement state between the first engaging part 142c of the first lever 142 and the second engaging part 143b of the second lever 143. Therefore, when an operator attempts to convert the unlocked state into the lockable state after installing the motion simulator, the operator pulls the second knob part 143a formed on the second lever 143 downward to release an engagement state between the first engaging part 142c and the second engaging part 143b. Then, when the operator pulls the first knob part 142a of the first lever 142 downward, the locking hook 123 and the locking recess 143d become interlockable as shown in FIG. 11 so that the unlocked state may be converted into the locking state again by the yaw of the caster 120.

As described above, since the motion simulator of the present invention is provided with the locking means 140 which can restrict the yaw of the caster 120, the present invention is advantageous in that, when the motion simulator is used, the caster 120 is fixed to be parallel to the rotational direction of the rotating plate 100 to inhibit the yaw of the caster 120 for preventing the caster from interfering with yaw of the rotating plate 100, and when the motion simulator is moved, the caster 120 can freely yaw to facilitate movement of the motion simulator.

Hereinafter, an operation of the motion simulator according to the present invention is described with reference to FIG. 13 to FIG. 18.

Figure 13:
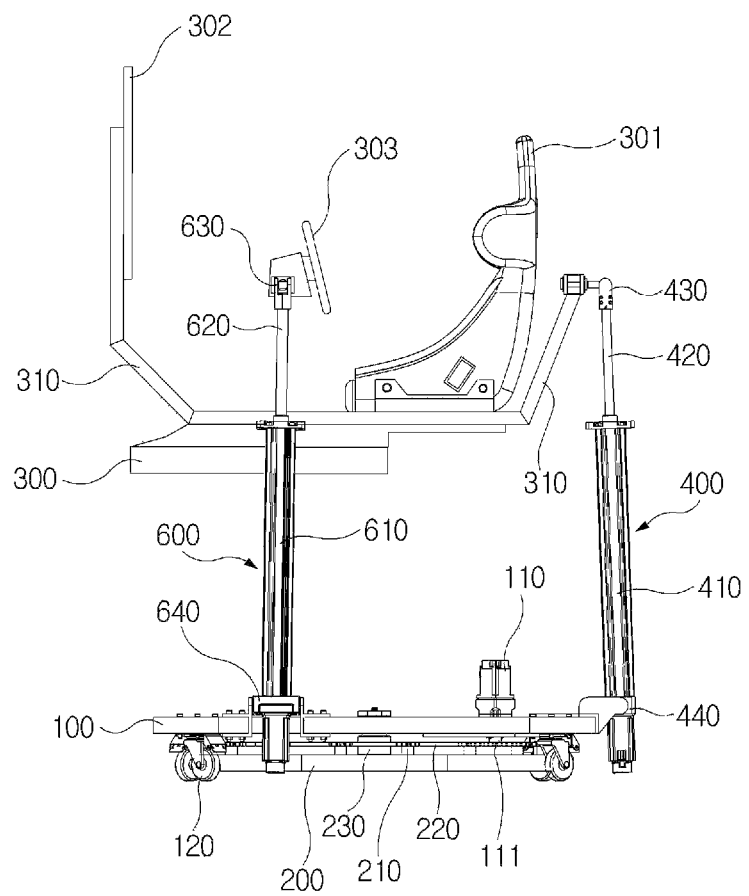
FIG. 13 is a view showing a raised state of a motion simulator according to the present invention.

As shown in FIG. 13, when the motion simulator is lifted, the first driving means, the second driving means and the third driving means are operated to slide the first rod 420, the second rod 520 and the third rod 620 upward, and the operating frame 300 is thus lifted.

In process of sliding the first rod 420, the second rod 520 and the third rod 620 upward as described above, the second upper connecting member 530, the second lower connecting member 540, the third upper connecting member 630 and the third lower connecting member 640, which are upper and lower end portions of the second link unit 500 and the third link unit 600, roll to enable the second link member 510 and the third link member 610 to be spread in a lateral direction by a predetermined angle.

Figure 14:
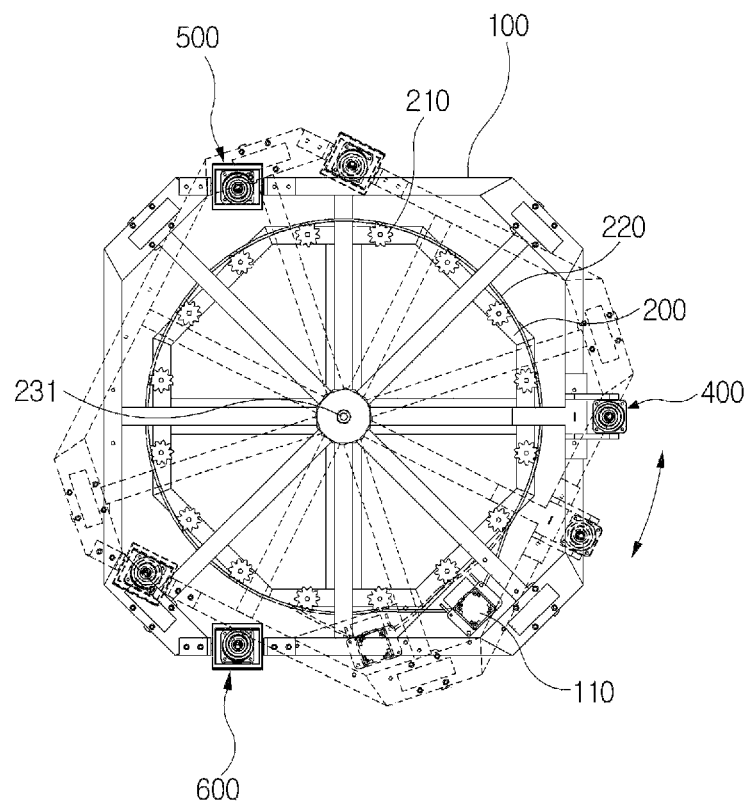
FIG. 14 is a view showing yaw of a motion simulator according to the present invention.

FIG. 14 illustrates yaw of the motion simulator according to the present invention. When the motion simulator yaws, the fixing plate 200 is supported on the floor and the rotating plate 100 can yaw quickly and accurately in both directions by relative motion of the first sprocket 111, the chain 220 and the second sprockets 210 caused by driving of the motor 110.

Figure 15:
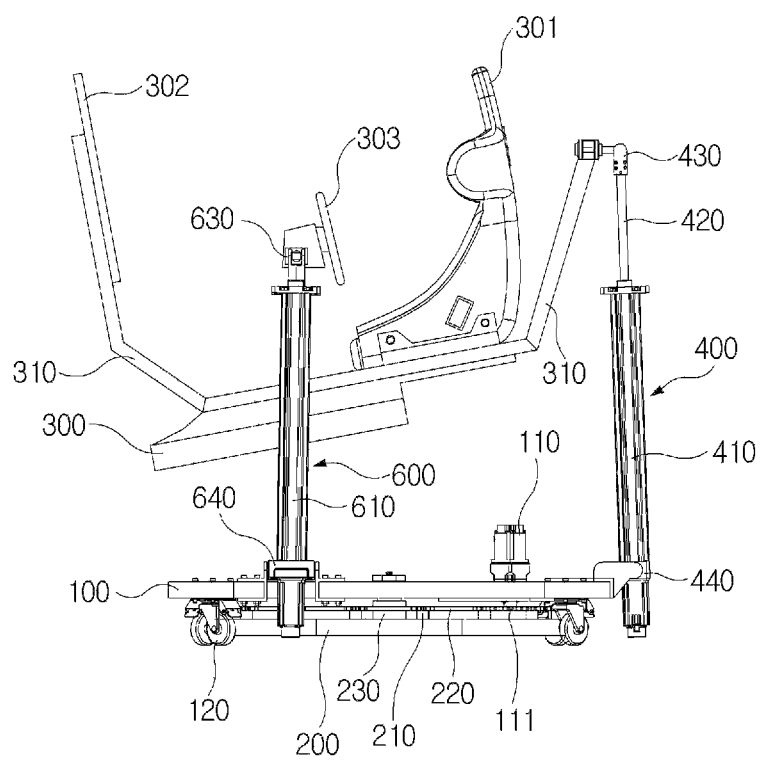
FIG. 15 and FIG. 16 are views showing pitch of a motion simulator according to the present invention.
Figure 16:
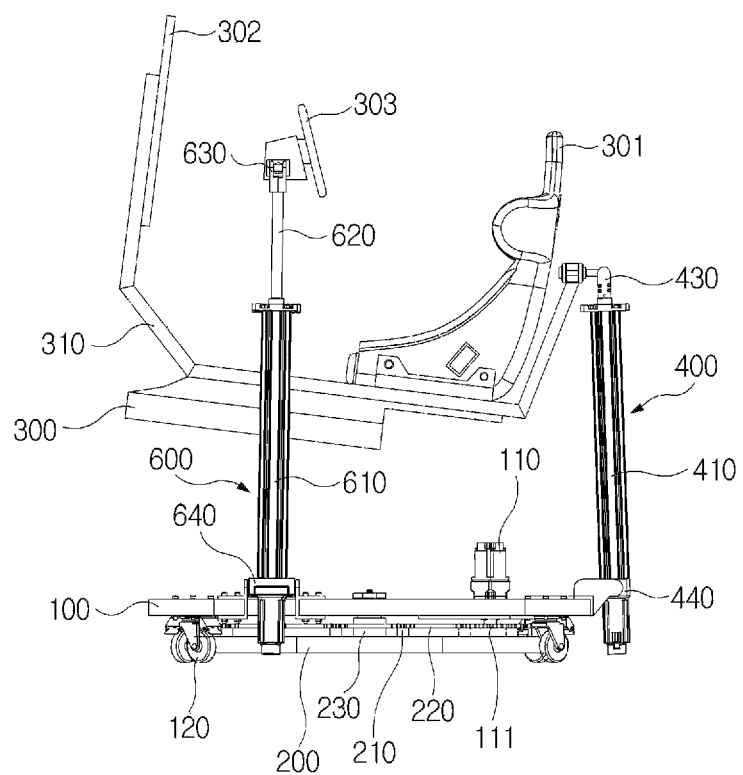

FIG. 15 and FIG. 16 illustrate pitch of the motion simulator according to the present invention.

To realize the state in which the operating frame 300 is tilted forward as shown in FIG. 15, the first driving means of the first link unit 400 is operated to slide the first rod 420 upward, and the second rod 520 and the third rod 620 are moved upward or downward by the second driving means and the third driving means of the second link unit 500 and the third link unit 600 to adjust a tilting angle.

To realize the state in which the operating frame 300 is tilted rearward as shown in FIG. 16, the second driving means and the third driving means of the second link unit 500 and the third link unit 600 are operated to slide the second rod 520 and the third rod 620 upward, and the first rod 420 is moved upward or downward by the first driving means of the first link unit 400 to adjust a tilting angle.

Figure 17:
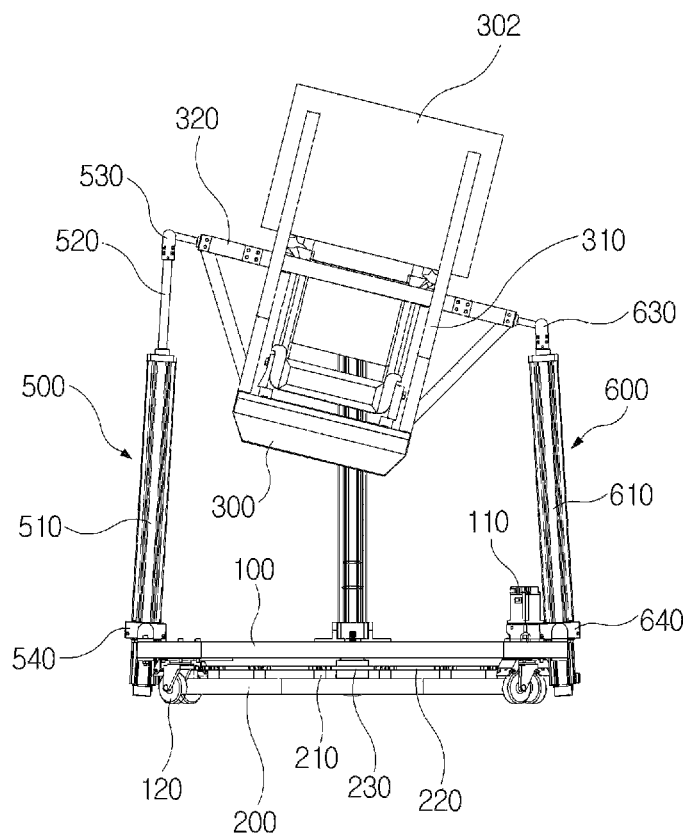
FIG. 17 and FIG. 18 are views showing roll of a motion simulator according to the present invention.
Figure 18:
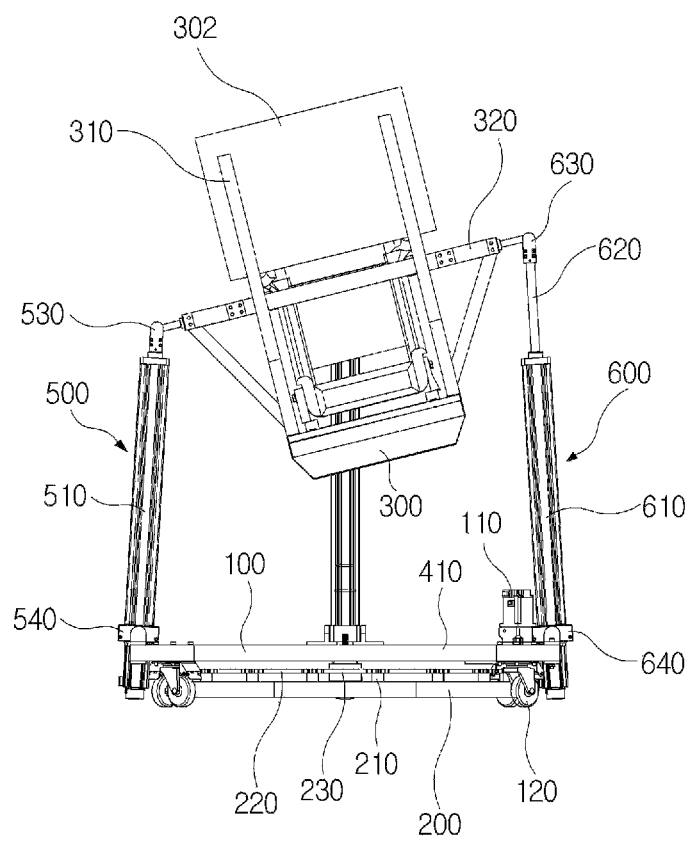

FIG. 17 and FIG. 18 illustrate roll of the motion simulator according to the present invention.

To realize the state in which the operating frame 300 is tilted leftward as shown in FIG. 17, the second driving means of the second link unit 500 is operated to slide the second rod 520 upward, and the third rod 620 is moved upward or downward by the third driving means of the third link unit 600 to adjust a tilting angle.

To realize the state in which the operating frame 300 is tilted rightward as shown in FIG. 18, the third driving means of the third link unit 600 is operated to slide the third rod 620 upward, and the second rod 520 is moved upward or downward by the second driving means of the second link unit 500 to adjust a tilting angle.

In the motion simulation of the present invention as describe above, since the raising/lowering movement, the yaw, the pitch and the roll are complexly performed by a simple configuration, three-dimensional motion with multiple degrees of freedom can be realized to enable the user to experience more realistic virtual environments.

The present invention is not limited to the specific preferred embodiments described above, and it will be apparent to those skilled in the art that obvious modifications can be made to the above-described exemplary embodiments of the present invention without departing from the spirit or scope of the invention. Thus, it is intended that the present invention cover all such modifications provided they come within the scope of the appended claims and their equivalents.

The invention claimed is:

1. A motion simulator, comprising;
   a rotating plate on which a motor is mounted through one side thereof and on which a plurality of casters are mounted through a lower surface thereof;
   a fixing plate supporting a lower portion of the rotating plate to enable the rotating plate to be rotated and having a driven part fixedly mounted thereon and meshed with a shaft of the motor;
   an operating frame disposed at and spaced apart from an upper portion of the rotating plate; and
   a plurality of link units coupled between the rotating plate and the operating frame to support and vertically move the operating frame;
   wherein the caster includes with a locking means restricting yaw of the caster with respect to a vertical line to lock the caster at a location which is parallel to rotation of the rotating plate when the motion simulator is used and to unlock the caster when the motion simulator is moved, and
   a rubber plate is disposed between a lower end portion of the fixing plate and a floor to allow the caster to be spaced apart from the floor when the motion simulator is used.

2. The motion simulator of claim 1, wherein a first sprocket is coupled to the shaft of the motor and the driven part comprises a plurality of second sprockets mounted on the fixing plate and a chain connected to the first sprocket and the plurality of second sprockets.

3. The motion simulator of claim 2, wherein the plurality of second sprockets mounted on the fixing plate are disposed at regular intervals with respect to a central axial line of the fixing plate and the first sprocket is eccentrically disposed outside an imaginary connecting line connecting the plurality of second sprockets.

4. The motion simulator of claim 1, wherein the rotating plate and the fixing plate are coaxially disposed on one central axial line and configured such that a distance from the central axial line to the border of the rotating plate is greater than a distance from the central axial line to the border of the fixing plate to allow the caster be located outside the fixing plate.

5. The motion simulator of claim 4, wherein a rotating support part to which a central shaft is rotatably coupled is disposed on an upper surface of a central portion of the fixing plate to support the rotating plate, a through hole is formed in a central portion of the rotating plate to allow the central shaft to vertically pass through the through hole, and a hardlock nut is coupled to the central shaft passing through the through hole.

6. The motion simulator of claim 1, further comprising a raising/lowering means disposed between the rotating plate and the caster for adjusting a vertical location of the caster.

7. The motion simulator of claim 6, wherein the raising/lowering means comprises;
   a fixing member mounted on a lower surface of the rotating plate;
   a vertical moving member secured to an upper surface of the caster and disposed so as to be vertically moved in the fixing member along with the caster; and
   a shaft passing through an upper portion of the fixing member, coupled to the vertical moving member through a lower end thereof and connected to a vertical driving means through an upper end thereof.

* * * * *